(12) United States Patent
Khorashadi et al.

(10) Patent No.: US 9,380,404 B2
(45) Date of Patent: Jun. 28, 2016

(54) METHOD AND APPARATUS FOR USE IN PROVIDING CONTEXT-AWARE IDENTIFICATION OF MOBILE DEVICE APPLICATIONS

(71) Applicant: QUALCOMM Incorporated, San Diego, CA (US)

(72) Inventors: Behrooz Khorashadi, Mountain View, CA (US); Dilma M. Da Silva, Mountain View, CA (US); Saumitra Das, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 13/927,021

(22) Filed: Jun. 25, 2013

(65) Prior Publication Data

US 2014/0378111 A1    Dec. 25, 2014

(51) Int. Cl.
*H04M 3/00* (2006.01)
*H04W 4/00* (2009.01)
*G06F 9/445* (2006.01)

(52) U.S. Cl.
CPC ............. *H04W 4/003* (2013.01); *G06F 9/4451* (2013.01)

(58) Field of Classification Search
CPC .................................................... H04W 4/003
USPC ......................................... 455/418, 405, 436
See application file for complete search history.

(56) References Cited

U.S. PATENT DOCUMENTS

| | | | |
|---|---|---|---|
| 8,731,529 B2* | 5/2014 | Lindeman et al. | 455/414.1 |
| 2004/0203863 A1 | 10/2004 | Huomo | |
| 2007/0286381 A1 | 12/2007 | Abramson et al. | |
| 2008/0289000 A1 | 11/2008 | Young et al. | |
| 2009/0030787 A1 | 1/2009 | Pon et al. | |
| 2009/0055523 A1* | 2/2009 | Song | H04L 67/306 709/224 |
| 2011/0307354 A1* | 12/2011 | Erman | G06F 8/60 705/27.1 |
| 2011/0320307 A1* | 12/2011 | Mehta | G06Q 30/0282 705/26.7 |
| 2012/0042036 A1* | 2/2012 | Lau | G06F 8/61 709/217 |
| 2012/0131095 A1 | 5/2012 | Luna et al. | |
| 2014/0201681 A1* | 7/2014 | Mahaffey | H04M 1/72569 715/846 |
| 2014/0244741 A1* | 8/2014 | Lasky | H04L 67/22 709/204 |
| 2014/0280131 A1* | 9/2014 | Martens | G06F 17/30867 707/736 |

(Continued)

OTHER PUBLICATIONS

Ejaz, Ali, "APPAAS: provisioning of context-aware mobile applications as a service", Jan. 2013, Queen's University, Canada.*
Ayed D., et al., "CADeComp: Context-aware deployment of component based applications", Journal of Netnork and Computer Applications, Academic Press, New York, NY, US, vol. 31, No. 3, Aug. 1, 2008, pp. 224-257, XP022655876, ISSN: 1084-8045, DOI: 10. 1016 / J.JNCA.2006.12.002 [retrieved on May 9, 2008].

(Continued)

*Primary Examiner* — David Q Nguyen
(74) *Attorney, Agent, or Firm* — Berkeley Law & Technology Group, LLP (57) ABSTRACT

Various methods, apparatuses, devices, and articles of manufacture are provided for use by one or more electronic devices to provide or otherwise identify applications for potential use by a mobile device with respect to a particular environment. For example, a computing device may apply a context-aware filter to identify a list of applications for potential use by a mobile device; and, in response to a first event proffer one or more applications for use by the mobile device; and, in response to a second event withdraw the application for use by the mobile device. In another example, a mobile device may, in response to a first indication that an application has been proffered for use, initiate activation of the application; and, in response to a second indication that the application has been withdrawn for use, initiate deactivation of the application.

50 Claims, 5 Drawing Sheets

(56) References Cited

U.S. PATENT DOCUMENTS

2014/0330881 A1* 11/2014 Stone et al. .................. 709/201
2014/0365602 A1* 12/2014 Hillary ................. H04W 4/001
                                                                                           709/217

OTHER PUBLICATIONS

International Search Report and Written Opinion—PCT/US2014/043970—ISA/EPO—Oct. 1, 2014.

* cited by examiner

METHOD AND APPARATUS FOR USE IN PROVIDING CONTEXT-AWARE IDENTIFICATION OF MOBILE DEVICE APPLICATIONS

BACKGROUND

1. Field

The subject matter disclosed herein relates to electronic devices, and more particularly to methods, apparatuses and articles of manufacture for use by one or more electronic devices to provide or otherwise identify mobile device applications for potential use by a mobile device with respect to a particular environment.

2. Information

As its name implies, a mobile device may be moved about, e.g. typically being carried by a user and/or possibly a machine. By way of some non-limiting examples, a mobile device may take the form of a cellular telephone, a smart phone, a tablet computer, a laptop computer, a wearable computer, a navigation and/or tracking device, etc.

A position and/or movements of a mobile device may be determined, at least in part, by a positioning and/or navigation capability (herein after simply referred to as a positioning capability) that may be implemented on board the mobile device, in one or more other electronic devices, and/or some combination thereof. Certain positioning capabilities may be based on one or more wireless signals transmitted by one or more transmitting devices and acquired by mobile device. By way of example, certain wireless signal-based positioning capabilities make use of wireless signals acquired from a satellite positioning system (SPS), such as, e.g., the global positioning system (GPS), etc. In another example, certain wireless signal-based positioning capabilities make use of wireless signals acquired from terrestrial-based wireless transmitting devices, such as, e.g., a dedicated positioning Beacon transmitting device, an access point (AP) which may be part of a wireless local area network, a base transceiver station which may be part of the cellular telephone system, and/or the like or some combination thereof. In certain implementations, a positioning capability may make use of one or more electronic files, such as, e.g., an electronic map, a routability graph, a radio heatmap, and/or the like or some combination thereof, to determine a position and/or other movements of the mobile device within a particular environment.

Certain mobile devices, e.g., such as smart phones, tablets, and certain wearable computers may be configured with a plethora of different mobile device applications (e.g., often referred to simply as "apps"). By way of example, there are hundreds of thousands of different apps available for iOS, Android, and/or other like mobile devices operating systems. Indeed, there are so many different apps available that it can be difficult for users to identify which apps may be of more or less usefulness. Accordingly, there may be missed opportunities for users of mobile devices to experience certain applications which may prove to be particularly useful under certain circumstances. Furthermore, in certain instances, numerous applications may lead to clutter on the mobile device's limited screen space and/or otherwise possibly hinder the user experience.

SUMMARY

In accordance with certain aspects, an example method may be provided which comprises, at a computing device: applying a context-aware filter to a plurality of mobile device applications to identify a list of applications for potential use by a mobile device with respect to a particular environment; in response to a first event, proffering an application identified in the list of applications for use by the mobile device; and in response to a second event, withdrawing the application for use by the mobile device.

In accordance with certain aspects, an example apparatus may be provided which comprises: means for applying a context-aware filter to a plurality of mobile device applications to identify a list of applications for potential use by a mobile device with respect to a particular environment; means for proffering an application identified in the list of applications for use by the mobile device in response to a first event; and means for withdrawing the application for use by the mobile device in response to a second event.

In accordance with certain aspects, an example computing device may be provided which comprises: memory; a network interface unit; and a processing unit coupled to the memory and the network interface unit and configured to: apply a context-aware filter to a plurality of mobile device applications to identify a list of applications for potential use by a mobile device with respect to a particular environment; in response to a first event, initiate transmission of a first indication via the network interface unit to the mobile device, the first indication to proffer an application identified in the list of applications for use by the mobile device; and in response to a second event, initiate transmission of a second indication via the network interface unit to the mobile device, the second indication to withdraw the application for use by the mobile device.

In accordance with certain aspects, an example article of manufacture may be provided which comprises a non-transitory computer readable medium having stored therein computer implementable instructions executable by a processing unit of a computing device to: apply a context-aware filter to a plurality of mobile device applications to identify a list of applications for potential use by a mobile device with respect to a particular environment; in response to a first event, initiate transmission of a first indication to the mobile device, the first indication to proffer an application identified in the list of applications for use by the mobile device; and in response to a second event, initiate transmission of a second indication to the mobile device, the second indication to withdraw the application for use by the mobile device.

In accordance with certain aspects, an example method may be provided which comprises, at a mobile device: identifying an application for potential use by the mobile device at least with respect to a particular environment, the application having been selected from a plurality of mobile device applications using a context-aware filter; in response to a first indication that the application is proffered for use by the mobile device, initiating activation of the application; and in response to a second indication that the application is withdrawn for use by the mobile device, initiating deactivation of the application.

In accordance with certain aspects, an example apparatus for use in a mobile device may be provided which comprises: means for identifying an application for potential use by the mobile device at least with respect to a particular environment, the application having been selected from a plurality of mobile device applications using a context-aware filter; means for initiating activation of the application, in response to a first indication that the application is proffered for use by the mobile device; and means for initiating deactivation of the application, in response to a second indication that the application is withdrawn for use by the mobile device.

In accordance with certain aspects, an example mobile device may be provided which comprises: a network interface unit; and a processing unit coupled to the network interface unit and configured to: identify an application for potential use by the mobile device at least with respect to a particular environment, the application having been selected from a plurality of mobile device applications using a context-aware filter; initiate activation of the application in response to a first indication that the application is proffered for use by the mobile device; and initiate deactivation of the application in response to a second indication that the application is withdrawn for use by the mobile device.

In accordance with certain aspects, an example article of manufacture may be provided which comprises a non-transitory computer readable medium having stored therein computer implementable instructions executable by a processing unit of a mobile device to: identify an application for potential use by the mobile device at least with respect to a particular environment, the application having been selected from a plurality of mobile device applications using a context-aware filter; initiate activation of the application in response to a first indication that the application is proffered for use by the mobile device; and initiate deactivation of the application in response to a second indication that the application is withdrawn for use by the mobile device.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Various techniques are described herein which may be implemented to provide or otherwise identify mobile device applications that may be of potential usefulness to a mobile device and/or its user, e.g. with respect to a particular environment.

As described in greater detail herein, in certain example implementations a computing device may apply a context-aware filter to a plurality of mobile device applications to identify a list of applications for potential use by a mobile device with respect to a particular environment. Several non-limiting example techniques are provided herein for deriving a context-aware filter. For example, in certain instances, a context-aware filter may be based, at least in part, on usage history associated with a plurality of mobile devices and/or other devices, e.g., with regard to a perceived usefulness of a particular application with respect to the particular environment. In certain instances, an example context-aware filter may be based, at least in part, on a location profile corresponding to a particular environment, a user profile corresponding to at least one mobile device, and/or a mobile device profile corresponding to certain features and/or capabilities of the mobile device, just to name a few examples.

The computing device may selectively proffer an application identified in the list of applications for use by said mobile device. For example, the computing device may proffer an application for potential use by a mobile device in response to determining that a first event may have occurred. In certain instances, a first event may occur should a mobile device be determined to be located within, possibly nearby, possibly headed towards, possibly scheduled to soon visit, etc., the particular environment. Thus, in certain instances, a first event may be determined based on a position fix or otherwise estimated location of a mobile device, which may be obtained by various known techniques or by association with the computing device for the purpose of network access, etc. Hence, in certain instances a first event may occur when a mobile device enters a known or determinable geo-fence and/or other like region corresponding to a particular environment. In certain instances, a first event may occur as a result of a mobile device being within a communication range of a local wireless network presence (e.g., a small communication cell, a femtocell, a pico cell, a Wi-Fi hotspot, an access point (AP) device, a Bluetooth device, etc.). By way some non-limiting examples, a computing device in these early and subsequent examples implementations may comprise one or more servers or other like computing resources, a personal computer, a wireless network access point, a cellular telephone base stations or other like network resources, a femptocell or picocell device, and/or the like or some combination thereof. Indeed, in certain instances, all or part of such computing device and/or applicable processing may be implemented using one or more mobile devices.

A mobile device may make use of a proffered mobile device application, e.g., while located within or nearby the particular environment. By way of example, a particular environment may correspond to a local wireless network presence, a particular enterprise (e.g., a work-related environment, etc.), a particular venue (e.g., a hospital, a stadium, a campus, an airport, an airplane, etc.), a location context identifier (LCI) and/or the like corresponding to all or part of an electronic map available for positioning/navigation services via the mobile device, an indoor environment, and/or the like or some combination thereof just to name a few examples.

The computing device may subsequently withdraw a proffered application for use by mobile device. For example, a proffered application may be withdrawn for use by the mobile device by the computing device in response to a determination that a second event may have occurred. In certain instances, a second event may occur should a mobile device be determined to be no longer located within or nearby, or possibly headed away from, etc., the particular environment. Thus, in certain instances, a second event may be determined based on a position fix or otherwise estimated location of a mobile device, which may be obtained by various known techniques. Hence, in certain instances a second event may occur when a mobile device leaves a known or determinable geo-fence and/or other like region corresponding to a particular environment. In certain instances, a second event may occur as a result of a mobile device being outside of a communication range of a local wireless network presence (e.g., a small communication cell, a femtocell, a pico cell, a Wi-Fi hotspot, an access point (AP) device, a Bluetooth device, etc.).

As described in greater detail herein, in certain example implementations a mobile device may identify an application for potential use at least with respect to a particular environment and initiate activation of the application, e.g., in response to a first indication that the application is proffered for use by said mobile device. Subsequently, a mobile device may initiate deactivation of an application, e.g., in response to a second indication that the proffered application is withdrawn for use by said mobile device. As described in greater detail below, in certain instances, a first indication and/or a second indication may be received from another device, or generated by the mobile device itself. By way of example, another device and/or the mobile device may determine whether a first event may have occurred, or second event may have occurred based, at least in part, on a wireless signal acquired by mobile device, a location of the mobile device, one or more sensor inputs, a user input, like or some combination just a few examples.

Figure 1:
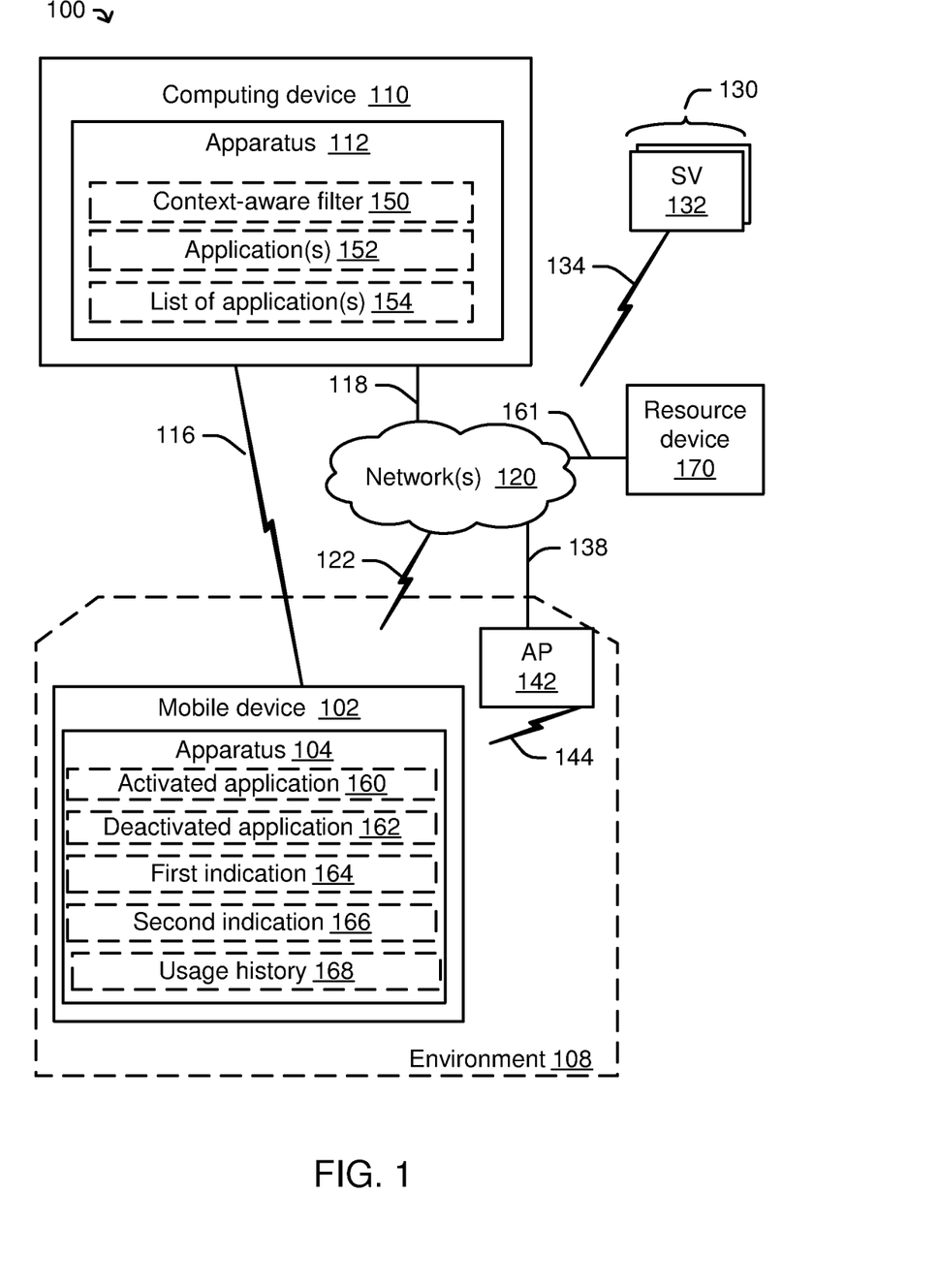
FIG. 1 is a schematic block diagram illustrating an arrangement of representative electronic devices including one or more electronic devices to provide or otherwise identify one or more mobile device applications for potential use by a mobile device with respect to a particular environment, in accordance with an example implementation.

Attention is now drawn to FIG. 1, which is a schematic block diagram illustrating an example arrangement 100 comprising at least one mobile device 102. Mobile device 102 is shown as being located within a particular environment 108.

In this example, mobile device 102 comprises an apparatus 104 capable of activating a proffered application and possibly making use of the activated application 160, and deactivating a withdrawn application, which may lead to a deactivated application 162, and/or removal of the application from mobile device 102. In certain instances, a first indication 164 and/or a second indication 166 may be obtained or otherwise generated by apparatus 104. In certain instances, a usage history 168 corresponding to mobile device 102 may be generated and possibly shared with one or more other devices by apparatus 104. In certain example implementations, a usage history may also be considered (e.g., in conjunction with first indication 164 and/or second indication 166) to determine whether to activate/deactivate or otherwise affect an application. For example, if mobile device 102 appears to be leaving an area but a usage history corresponding to the mobile device and/or possibly other mobile device(s) indicates the mobile device is likely to be back soon, then it may be beneficial to not deactivate a particular application (e.g., at least not for some time, etc.).

As illustrated, mobile device 102 may communicate (e.g., via one or more messages) to one or more other electronic devices over a wired and/or wireless communication link. For example, in certain instances mobile device 102 may communicate with computing device 110, possibly directly via communication link 116, and/or possibly indirectly via communication link 122, network(s) 120, and communication link 118. In certain instances, mobile device 102 may communicate with computing device 110, via communication link 144, an access point (AP) 142 and/or other like device, communication link 138, network(s) 120, and communication link 118. Although certain communication links are illustrated in FIG. 1 as being either wireless communication links or wired communication links, it should be kept in mind that such communication links may comprise wired and/or wireless communication links, and/or even other intervening and/or supporting devices, etc.

Computing device 110, which may be located within, nearby, or remotely from environment 108, may comprise an apparatus 112 capable of driving and/or applying a context-aware filter 150 to a plurality of mobile device applications 152 to generate a list of applications 154 with respect to a particular environment 108. As mentioned, the list of applications 154 may be of particular usefulness to mobile device 102 with respect to particular environment 108. In certain implementations, computing device 110 may provide all or part of one or more applications to mobile device 102. In certain implementations, computing device 110 may provide additional information to mobile device 102 regarding other resource device(s) 170 (e.g., servers, etc.) that may be capable of providing all or part of one or more applications to mobile device 102, e.g., via communication link 161 and network(s) 120. While illustrated as separate devices in FIG. 1, in certain implementations computing device 110 and resource device 170 may be combined and/or otherwise part of some other electronic device.

As illustrated in FIG. 1, mobile device 102 may acquire various wireless signals transmitted from various other electronic devices, some of which may be physically located within particular environment 108 and some of which may be physically located outside of environment 108. In this example, a wireless computing and/or communication network, which may comprise one or more interconnected wireless transceiver devices, is represented by an access point (AP) 142 which may transmit wireless signals over a communication link 144. In certain implementations, mobile device 102 may acquire a wireless signal over communication link 144 and possibly use such wireless signal for positioning, and/or for other uses. In certain instances, mobile device 102 may be capable of transmitting wireless signals to AP 142 (e.g., AP 142 may represent a transceiver device and/or the like). In other instances, AP 142 may be representative of a wireless transmitting device which may be limited to only transmitting wireless signals (e.g., AP 142 may represent a dedicated positioning Beacon transmitter and/or other like transmitting device). In certain implementations, some wireless transceiver devices may be further coupled to one or more other devices. Here, for example, AP 142 is illustrated as having a communication link 138 to network(s) 120.

In certain example implementations, one or more wireless transceiver devices may be provisioned, at least in part, as part of a terrestrial-based positioning system. In certain example implementations, AP 142 and/or network(s) 120 may be representative of a base transceiver station and/or the like, which may be provisioned as part of a cellular communication system.

Network(s) 120 is intended to represent all or part of one or more other electronic devices and/or communication facilities and/or resources capable of supporting wired and/or wireless electronic communication. Thus for example, network(s) 120 may comprise all or part of a telephone network, a cellular telephone network, a wireless communication network, an intranet, the Internet, and/or the like or some combination thereof.

Although communication link 118 between network(s) 120 and computing device 110 and communication link 138 are illustrated here as representing "wired" communication links it should be understood that in certain instances these communication links may represent one or more wired and/or wireless communication links. Furthermore, it should be understood that a "wired" communication link may comprise electrically conductive wires, cables, etc., and/or similar light or other wavelength conductive members, e.g., fiber-optic cables, waveguides, etc.

As further illustrated, in certain implementations arrangement 100 may comprise one or more space positioning systems (SPS) 130, which may transmit applicable wireless signals that may, at times, be acquired by mobile device 102 and used, at least in part, to support a positioning function. Here, for example, SPS 130 may comprise a plurality of space vehicles (SVs) 132, each of which may transmit one or more SPS signals 134. Further, for example, in certain implementations a terrestrial positioning system may wireless transceiver devices and/or the like, which may transmit one or more positioning signals (e.g., which may be represented here by communication link 144).

Figure 2A:
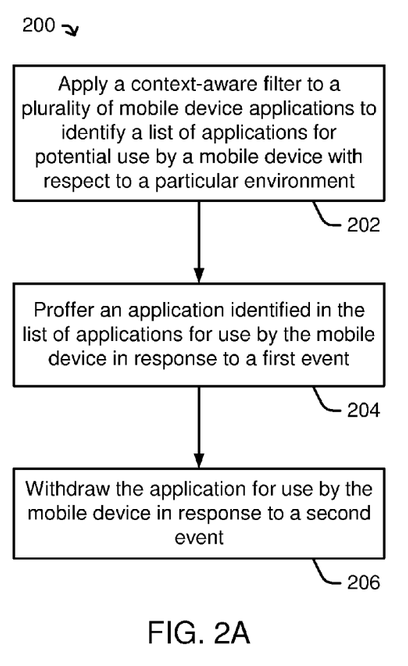
FIG. 2A and FIG. 2B are flow diagrams illustrating example processes that may be implemented in one or more computing devices to provide or otherwise identify one or more mobile device applications for potential use by a mobile device with respect to a particular environment, in accordance with certain example implementations.

Attention is drawn next to FIG. 2A, which is a flow diagram illustrating an example process 200 that may be implemented in computing device 110 to provide or otherwise identify one or more mobile device applications for potential use by mobile device 102 with respect to particular environment 108.

At example block 202, a context-aware filter may be applied to a plurality of mobile device applications to identify a list of applications (e.g., identifying one or more applications) for potential use by mobile device 102 with respect to at least one particular environment 108. In certain instances, a list of applications may comprise all or part of one or more applications, one or more identifiers for one or more applications, and/or the like or some combination thereof. In certain instances, a list of applications may be indicative of one or more resource devices 170 capable of providing all or part of one or more applications to mobile device 102 and/or other devices.

At example block 204, an application identified in the list of applications may be proffered for use by mobile device 102 in response to a first event. In certain embodiments, first indication 164 may be transmitted from computing device 110 to mobile device 102, e.g., in response to a determination by computing device 110 that the first event may have occurred. Here, for example, first indication 164 may be indicative of at least one application identified in the list of applications being proffered for use by mobile device 102. In certain other embodiments, first indication 164 may be generated by mobile device 102, e.g., in response to determining that the first event may have occurred. In still other embodiments, first indication 164 may be obtained from one or more other devices.

At example block 206, the proffered application (e.g., as per example block 204) may be withdrawn for use by mobile device 102 in response to a second event. In certain embodiments, second indication 166 may be transmitted from computing device 110 to mobile device 102, e.g., in response to a determination by computing device 110 that the second event may have occurred. Here, for example, second indication 166 may be indicative of at least one application identified in the list of applications being withdrawn for use by mobile device 102. In certain other embodiments, second indication 166 may be generated by mobile device 102, e.g., in response to determining that the second event may have occurred. In still other embodiments, second indication 166 may be obtained from one or more other devices.

Figure 2B:
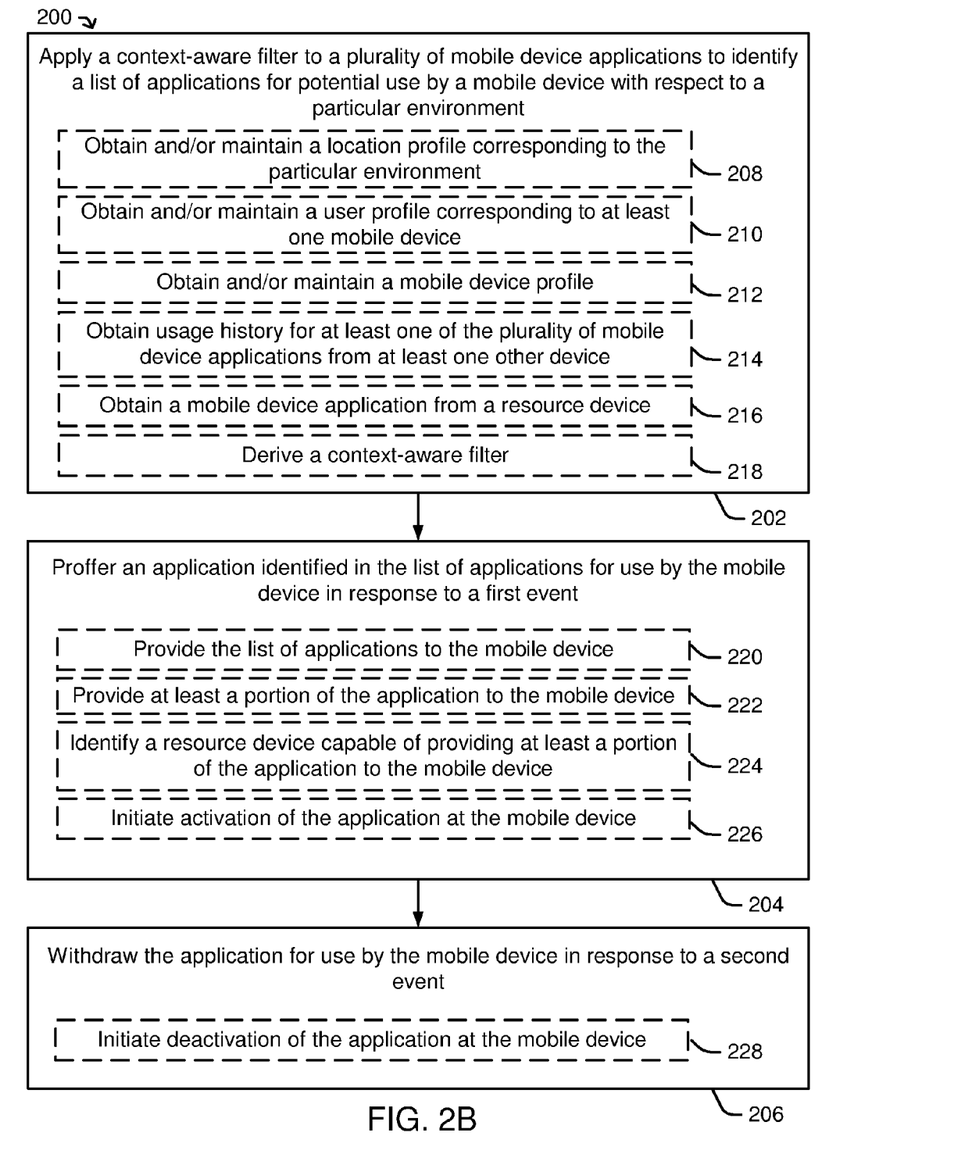

Attention is drawn next to FIG. 2B, which is a flow diagram illustrating an expanded version of process 200 that may be implemented in computing device 110 to provide or otherwise identify one or more mobile device applications for potential use by mobile device 102 with respect to particular environment 108.

As shown, at example block 202 a context-aware filter may be applied to a plurality of mobile device applications to identify a list of applications (e.g., identifying one or more applications) for potential use by mobile device 102 with respect to at least one particular environment 108.

In certain instances, at further example block 208, a location profile corresponding to a particular environment 108 may be obtained and/or maintained, at least in part, by computing device 110. Here, for example, a location profile may be indicative of one or more mobile device applications which may be more likely or less likely of use to a mobile device 102 (or its user) with respect to particular environment 108. By way of example, let us assume that a particular environment 108 includes at least part of a shopping mall having a plurality of stores and/or other like services that may be of interest to a user of a mobile device. In this example, a location profile may be indicative of one or more mobile device applications that correspond to the stores and/or other like services within particular environment 108, or possibly indicative of one or more mobile device applications that do not correspond and/or may be contradictory to the stores and/or other like services within a particular environment 108. In certain instances, a location profile may be based, at least in part, usage history as reported and/or otherwise gathered from a plurality of mobile devices with regard to particular environment 108. In certain instances, a location profile may be based, at least in part, on network traffic and/or other data/processing metrics from which a popularity and/or other usefulness of a mobile device application amongst mobile devices may be inferred or otherwise possibly indicated. In certain instances, a location profile may be based, at least in part, on user input(s) from one or more mobile device users, service provider users, and/or other types of users. In certain instances, a location profile may be based, at least in part, on specific applications being provided for particular environment 108 by one or more entities, enterprises, venues, service providers, etc. In certain instances, a location profile may be based, at least in part, on traffic flow or other like information corresponding to the movement of mobile devices within particular environment 108.

In certain instances, at further example block 210, a user profile corresponding to at least one mobile device may be obtained and/or maintained, at least in part, by computing device 110. Here, for example, a user profile may be indicative of one or more mobile device applications which may be more likely or less likely of use by a specific user, or possibly a group/classification of users (e.g., possibly based on some demographic, group membership, social network ties, etc.), of a particular mobile device 102 with respect to particular environment 108, and/or possibly other like or possibly similar environments. By way of example, let us assume that a particular environment 108 includes at least part of a shopping mall having a plurality of stores and/or other like services that may be of interest to a user of a mobile device. In this example, a user profile may be indicative of one or more mobile device applications that correspond to the stores and/or other like services within particular environment 108 that are known to be (or believed to be) of interest and/or particular use to a user indicated by the user profile. For example, a user profile may indicate that a particular user is known to be or believed to be interested in a mobile device application for a cigar shop located within a shopping mall. Conversely, in certain instances a user profile may be indicative of one or more mobile device applications that correspond to certain stores and/or other like services within particular environment 108 that are known to not be (or believed to not be) of interest and/or particular use to a user indicated by the user profile. For example, in certain instances a user profile may indicate that a particular user is not known nor believed to be interested in a mobile device application for a cigar shop located within a shopping mall. In certain instances, a user profile may be based, at least in part, a usage history as reported and/or otherwise gathered from by a particular mobile device and/or other mobile devices with regard to particular environment 108. In certain instances a user profile may be indicative of one or more user preferences corresponding to mobile device 102, one or more mobile device applications, etc.

In certain instances, at further example block 212, a mobile device profile may be obtained and/or maintained, at least in part, by computing device 110. By way of example, a mobile device profile may be indicative of one or more features and/or capabilities corresponding to a particular mobile device, and/or possibly one or more types of mobile devices. Just to name a few examples, a mobile device profile may be indicative of (and/or otherwise based at least in part on) a make/model of a mobile device, a display capability of a mobile device, a sensor capability of a mobile device, a memory capability of a mobile device, an operating system a mobile device, a service provider corresponding to mobile device, and/or the like or some combination thereof.

In certain instances, at further example block 214, a usage history for at least one of the plurality of mobile device applications may be obtained by computing device 110 from at least one other device (e.g., mobile device 102, etc.). By way of example, all or part of a usage history may be maintained and provided from mobile device 102 which is indicative of (and/or otherwise based at least in part on) the usage of (or possibly lack thereof) one or more mobile device applications, e.g., with respect to a particular environment 108. For example, a usage history may indicate that a particular mobile device application was used for a particular period of time and/or for particular purpose while mobile device 102 was located within or nearby particular environment 108. For example, a usage history may indicate that a particular mobile device application operated properly or not. For example, a usage history may indicate that a user accepted or declined a particular mobile device application and/or feature thereof. In still other instances, a usage history may comprise (and/or otherwise based at least in part on) usage history gathered from and/or possibly combined from a plurality of mobile devices. In still other instances, a usage history may indicate that one or more applications may share some particular trait. For example, in certain implementations one more applications may be considered "related", etc., as result of having some common purpose or otherwise related usage, as a result of having been obtained or otherwise associated with a common source/provider, as a result of being deemed to belong to a particular category of applications, etc., just to name a few examples. In another example, a usage history may indicate whether applications were obtained by the mobile device in response to specific user approval/direction, or possibly obtained in a more automated manner (e.g., possibly without and/or in advance of any specific user approval/direction, possibly based on a broader general/generic (e.g., less specific) user approval/direction, etc.

As previously mentioned, in certain instances, at further example block 216, computing device 10 may obtain all or part of one or more mobile device applications from one or more resource devices 170.

In certain instances, at further example block 218, computing device 110 may derive all or part of a context-aware filter 150. By way of example, in certain instances, context-aware filter 150 may be based, at least in part, on a location profile corresponding to a particular environment 108, e.g., as per block 208. By way of example, in certain instances, context-aware filter 150 may be based, at least in part, on a user profile, e.g., as per block 210. By way of example, in certain instances, context-aware filter 150 may be based, at least in part, on a mobile device profile, e.g., as per block 212. By way of example, in certain instances context-aware filter 150 may be based, at least in part, on a usage history, e.g., as per block 214.

At example block 204, an application identified in the list of applications may be proffered for use by mobile device 102 in response to a first event. As mentioned, in certain embodiments, a first indication 164 may be provided which is indicative that one or more applications are proffered for use by mobile device 102. In certain instances, at further example 220, a list of applications may be provided to mobile device 102, e.g., which may serve as an indication that one or more of such applications are proffered for use by mobile device 102. In certain instances, at further example block 222, all or part of one or more applications being proffered to mobile device 102 may be provided by computing device 110 to mobile device 102. For example, in certain instances all or part of an application may be "pushed" to mobile device 102 from computing device 110, or possibly "pulled" by mobile device 102 from computing device 110. In certain instances, at further example block 224, one or more devices (e.g., resource device(s) 170, other mobile devices, an AP device, etc.) capable of providing all or part of one or more applications being proffered to mobile device 102 may be identified. In certain instances, at further example block 226, as result of or as part of proffering an application, computing device 110 may initiate activation of all or part of one or more applications at the mobile device. By way of example, initiating activation of an application may lead to all or part of an application being downloaded by mobile device 102. In certain examples, initiating activation of an application may lead an existing application stored at mobile device 102 to become active or otherwise available for use. Here, for example, activation of an application may install the application on home screen of a graphical user interface capability, etc., which may allow a user to select or otherwise make use of the application. In certain instances, initiating activation of an application may lead to all or part of the application stored in memory in a compressed format to be the decompressed. In certain instances, initiating activation of an application may lead to all or part of the application stored in memory in an encrypted format to be unencrypted. In certain instances, initiating activation of an application may lead to all or part of the application being updated, e.g., via one or more resource devices. In certain instances, initiating activation of an application may further indicate to a mobile device that computing device 110 may desire a usage history, e.g., corresponding to the application being activated, etc. In certain example implementations, it may be useful for one of the screens displayed on a mobile device to be dedicated to or otherwise correspond to a set of applications, e.g., which may have been recommended via a context aware filter, etc. By way of example, certain mobile device operating systems support multiple tab, folder, screen, and/or other like distinct viewing capabilities for arranging/presenting selectable icons and/or the like for available applications. Further, in certain example implementations, one or more notifications, alerts, interruptions, and/or the like, may be initiated or made available under certain conditions (e.g., depending on user preferences, device settings/mode, time/date, etc.) based on context aware information/decisions, activated/deactivated applications, etc.

At example block 206, a proffered application (e.g., as per example block 204) may be withdrawn for use by mobile device 102 in response to a second event. As mentioned, in certain embodiments, a second indication 166 may be transmitted from computing device 110 to mobile device 102 which may be indicative that one or more proffered applications are withdrawn for use by mobile device 102. In certain instances, at example block 228, as result of or as part of withdrawing an application, computing device 110 may initiate deactivation of all or part of one or more applications at the mobile device. By way of example, initiating deactivation of an application may lead to all or part of an application being deleted from mobile device 102, or possibly being moved within memory within mobile device 102 (e.g., moved from a primary memory to a secondary memory), or possibly even being moved from mobile device 102 to another device (e.g., a cloud service, etc.). In certain examples, initiating deactivation of an application may lead to an existing application being rendered inactive or otherwise made unavailable for use or possibly hidden from the user or otherwise made more difficult to locate/select by the user. Thus, in certain examples, a deactivation of an application may uninstall the application on a home screen of a graphical user interface capability, etc., which may prevent the user from selecting or otherwise making use of the application. In certain instances, initiating deactivation of an application may lead to all or part of the application being stored in memory in a compressed format. In certain instances, initiating deactivation of an application may lead to all or part of the application being stored in memory in an encrypted format. In certain instances, initiating deactivation of an application may further indicate to a mobile device that computing device 110 may request a usage history, e.g., corresponding to the application being deactivated, etc.

Figure 3A:
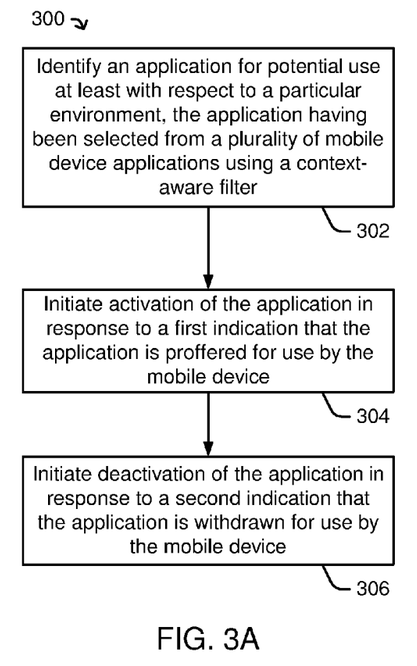
FIG. 3A and FIG. 3B are flow diagrams illustrating example processes that may be implemented in a mobile device to identify one or more mobile device applications for potential use by a mobile device with respect to a particular environment, in accordance with certain example implementations.

Attention is drawn next to FIG. 3A, which is a flow diagram illustrating an example process 300 that may be implemented in mobile device 102 to identify one or more mobile device applications for potential use by mobile device 102 with respect to particular environment 108, in accordance with certain example implementations.

At example block 302 an application may be identified for potential use at least with respect to particular environment 108, the application having been selected from a plurality of mobile device applications using a context-aware filter, e.g., as per example block 202 in process 200.

At example block 304, activation of an application may be initiated, e.g., in response to first indication 164 that the application is proffered for use by the mobile device. By way of example, in certain instances, first indication 164 may be received from computing device 110, or possibly one or more other devices. By way of example, in certain instances first indication 164 may be generated by mobile device 102.

At example block 306, deactivation of an application may be initiated, e.g., in response to second indication 166 that the application is withdrawn for use by mobile device 102. By way of example, in certain instances, second indication 166 may be received from computing device 110, or possibly one or more other devices. By way of example, in certain instances second indication 166 may be generated by mobile device 102.

In certain example implementations, example blocks 302 and 304 may be combined. For example, in certain instances, a first indication may be indicative of one or more applications for proffered for potential use by mobile device 102. In another example, in certain instances, a list of applications (e.g., identifying one or more applications proffered for potential use by mobile device 102) may be indicative of a first indication.

Figure 3B:
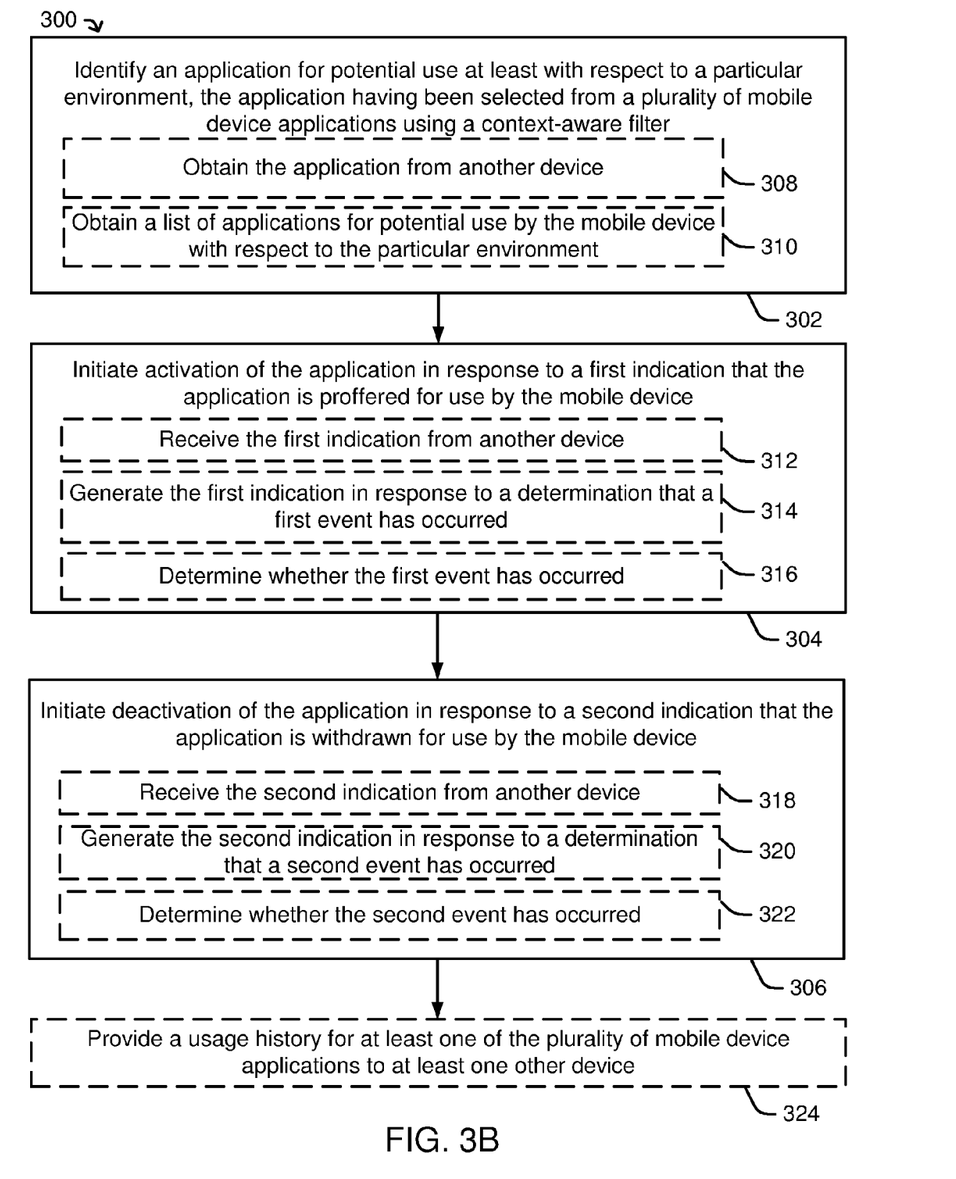

Attention is drawn next to FIG. 3B, which is a flow diagram illustrating an expanded version of process 300 that may be implemented in mobile device 102 to identify one or more mobile device applications for potential use by mobile device 102 with respect to particular environment 108, in accordance with certain example implementations.

At example block 302 an application may be identified for potential use at least with respect to particular environment 108, the application having been selected from a plurality of mobile device applications using a context-aware filter, e.g., as per example block 202 in process 200. In certain instances, at further example block 308, all or part of one or more applications may be obtained from other device(s), e.g., computing device 110, resource(s) 170, and/or possibly one or more other mobile devices. In certain instances, at further example block 310, a list of applications for potential use by mobile device 102 with respect to particular environment 108 may be obtained, e.g., from computing device 110.

At example block 304, activation of an application may be initiated, e.g., in response to first indication 164 that the application is proffered for use by the mobile device. As mentioned, in certain instances, at further example block 312, first indication 164 may be received from one or more other devices, e.g., computing device 110. In certain instances, at further example block 314, first indication 164 may be generated by mobile device 102, e.g. in response to a determination that a first event may have occurred. Accordingly, in further example block 316, mobile device 102 may determine whether a first event may have occurred. Several examples of detectable events have been previously described, one or more of which may considered in determining whether a first event may have occurred.

At example block 306, deactivation of an application may be initiated, e.g., in response to second indication 166 representing that the application is withdrawn for use by mobile device 102. As mentioned, in certain instances, at further example block 318, second indication 166 may be received from one or more other devices, e.g., computing device 110. In certain instances, at further example block 320, second indication 166 may be generated by mobile device 102, e.g. in response to a determination that a second event may have occurred. Accordingly, in further example block 322, mobile device 102 may determine whether a second event may have occurred. Several examples of detectable events have been previously described, one or more of which may considered in determining whether a second event may have occurred.

In certain example implementations, at further example block 324, all or part of usage history may be maintained and provided by mobile device 102 to one or more other devices, e.g., computing device 110. Here, for example, a usage history may be indicative of and/or otherwise based, at least in part, on a use or lack thereof of one or more of the mobile device applications proffered for potential use by mobile device 102.

Figure 4:
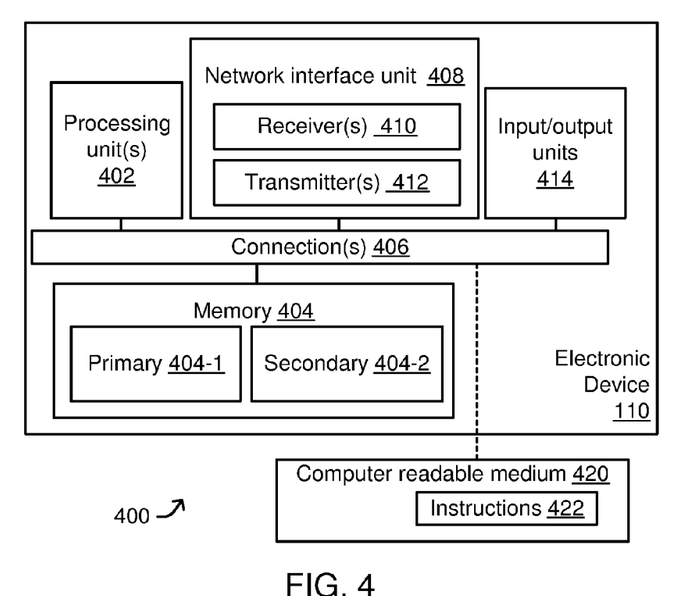
FIG. 4 is a schematic diagram illustrating certain features of an example computing device to provide or otherwise identify one or more mobile device applications for potential use by a mobile device with respect to a particular environment, in accordance with certain example implementations.

Reference is made next to FIG. 4, which is a schematic block diagram illustrating certain features of an example special computing platform 400 which may be provided as part of computing device 110, and/or apparatus 112 provisioned therein.

As illustrated special computing platform 400 may comprise one or more processing units 402 (e.g., to perform data processing in accordance with the techniques provided herein, apparatus 112, context-aware filter 150) coupled to memory 404 via one or more connections 406 (e.g., one or more electrical conductors, one or more electrically conductive paths, one or more buses, one or more fiber-optic paths, one or more circuits, one or more buffers, one or more transmitters, one or more receivers, etc.). Processing unit(s) 402 may, for example, be implemented in hardware or a combination of hardware and software. Processing unit(s) 402 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 404 may be representative of any data storage mechanism. Memory 404 may include, for example, a primary memory 404-1 and/or a secondary memory 404-2. Primary memory 404-1 may comprise, for example, a random access memory, read only memory, etc. While illustrated in this example as being separate from the processing units, it should be understood that all or part of a primary memory may be provided within or otherwise co-located and coupled with processing unit 402 or other like circuitry within computing device 110. Secondary memory 404-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 420. Memory 404 and/or non-transitory computer readable medium 420 may comprise instructions 422 for use in performing data processing, e.g., in accordance with the applicable techniques as provided herein.

Special computing platform 400 may, for example, further comprise one or more network interface unit(s) 408. Network interface unit(s) 408 may, for example, comprise one or more wired and/or wireless communication interfaces, represented here by one or more receivers 410 and one or more transmitters 412. It should be understood that in certain implementations, communication interface 408 may comprise one or more transceivers, and/or the like. Further, it should be understood that although not shown, communication interface 408 may comprise one or more antennas and/or other circuitry as may be applicable given the communication interface capability.

In accordance with certain example implementations, network interface unit(s) 408 may, for example, be enabled for use with various wired communication networks, e.g., such as telephone system, a local area network, a wide area network, a personal area network, an intranet, the Internet, etc.

Accordance with certain example implementations network interface unit(s) 408 and/or 508 (see FIG. 5) may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 408 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN.

Computing device 110 may, for example, further comprise one or more input and/or output units 414. Input and/or output units 414 may represent one or more devices or other like mechanisms that may be used to obtain inputs from and/or provide outputs to one or more other devices and/or a user. Thus, for example, input and/or output units 414 may comprise various buttons, switches, a touch pad, a trackball, a joystick, a touch screen, a keyboard, and/or the like, which may be used to receive one or more user inputs. In certain instances, input and/or output units 414 may comprise various devices that may be used in producing a visual output, an audible output, and/or a tactile output for a user. For example, input and/or output units 414 may be used to present a video display, graphical user interface, etc., on a display mechanism.

Figure 5:
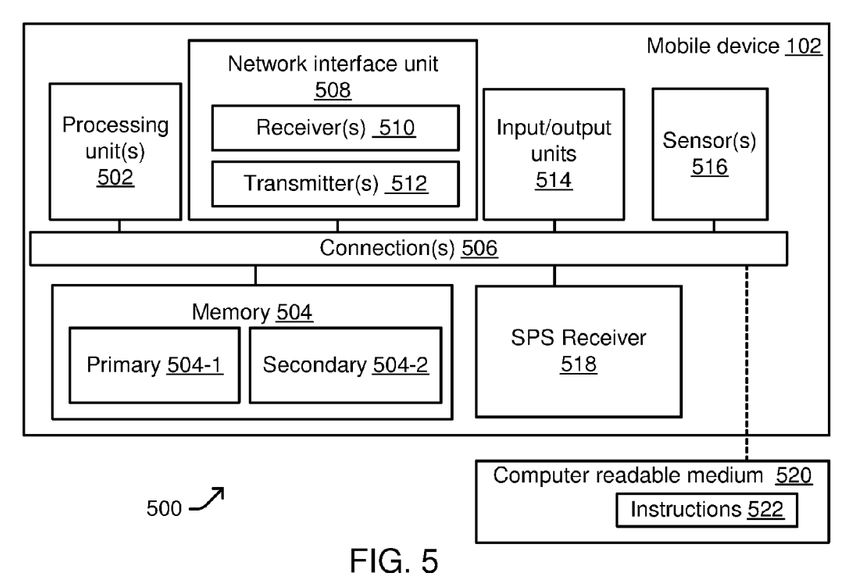
FIG. 5 is a schematic diagram illustrating certain features of an example mobile device to identify one or more mobile device applications for potential use by a mobile device with respect to a particular environment, in accordance with certain example implementations.

Attention is now drawn to FIG. 5, which is a schematic block diagram illustrating certain features of an example special computing platform 500 which may be provided as part of mobile device 102, and/or apparatus 104 provisioned therein.

As illustrated special computing platform 500 may comprise one or more processing units 502 (e.g., to perform data processing in accordance with the techniques provided herein, apparatus 104, anomaly detector 106) coupled to memory 504 via one or more connections 506 (e.g., one or more electrical conductors, one or more electrically conductive paths, one or more buses, one or more fiber-optic paths, one or more circuits, one or more buffers, one or more transmitters, one or more receivers, etc.). Processing unit(s) 502 may, for example, be implemented in hardware or a combination of hardware and software. Processing unit(s) 502 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof. Processing unit(s) 502 may, for example, perform computer implementable instructions corresponding to one or more applications(s) 152 (FIG. 1).

Memory 504 may be representative of any data storage mechanism. Memory 504 may include, for example, a primary memory 504-1 and/or a secondary memory 504-2. Primary memory 504-1 may comprise, for example, a random access memory, read only memory, etc. While illustrated in this example as being separate from the processing units, it should be understood that all or part of a primary memory may be provided within or otherwise co-located and coupled with processing unit 502 or other like circuitry within mobile device 102. Secondary memory 504-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 520. Memory 504 and/or non-transitory computer readable medium 520 may comprise instructions 522 for use in performing data processing, e.g., in accordance with the applicable techniques as provided herein.

Special computing platform 500 may, for example, further comprise one or more network interface units 508. Network interface unit 508 may, for example, comprise one or more wired and/or wireless communication interfaces, represented here by one or more receivers 510 and one or more transmitters 512. It should be understood that in certain implementations, network interface unit 508 may comprise one or more transceivers, and/or the like. Further, it should be understood that although not shown, network interface unit 508 may comprise one or more antennas and/or other circuitry as may be applicable given the communication interface capability.

In accordance with certain example implementations, network interface unit 508 may, for example, be enabled for use with various wired communication networks, e.g., such as telephone system, a local area network, a wide area network, a personal area network, an intranet, the Internet, etc.

Mobile device 102 may, for example, further comprise one or more input and/or output units 514. Input and/or output units 514 may represent one or more devices or other like mechanisms that may be used to obtain inputs from and/or provide outputs to one or more other devices and/or a user. Thus, for example, input and/or output units 514 may comprise various buttons, switches, a touch pad, a trackball, a joystick, a touch screen, a keyboard, a microphone, a camera, and/or the like, which may be used to receive one or more user inputs. In certain instances, input and/or output units 514 may comprise various devices that may be used in producing a visual output, an audible output, and/or a tactile output for a user. For example, input and/or output units 514 may be used to present a video display, graphical user interface, positioning and/or navigation related information, visual representations of electronic map, routing directions, etc., via a display mechanism and/or audio mechanism.

Mobile device 102 may, for example, comprise one or more sensors 516. For example, sensor(s) 516 may represent one or more environmental sensors, such as, e.g., a magnetometer or compass, a barometer or altimeter, etc., and which may be useful for positioning. For example, sensor(s) 516 may represent one or more inertial sensors, which may be useful in detecting certain movements of mobile device 102. Thus for example, sensor(s) 516 may comprise one or more accelerometers, one or one or more gyroscopes or gyrometers, Further, in certain instances sensor(s) 516 may comprise and/or take the form of one or more input devices such as a microphone, a camera, a light sensor, etc.

SPS receiver 518 may be capable of acquiring and acquiring wireless signals 134 via one or more antennas (not shown). SPS receiver 518 may also process, in whole or in part, acquired wireless signals 134 for estimating a position and/or a motion of mobile device 102. In certain instances, SPS receiver 518 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of mobile device 102. In certain implementations, all or part of such processing of acquired SPS signals may be performed by other processing capabilities in mobile device 102, e.g., processing unit(s) 502, memory 504, etc., in conjunction with SPS receiver 518. Storage of SPS or other signals for use in performing positioning operations may be performed in memory 504 or registers (not shown).

In certain instances, sensor(s) 516 may generate analog or digital signals that may be stored in memory 504 and processed by DPS(s) (not shown) or processing unit(s) 502 in support of one or more applications such as, for example, applications directed to positioning or navigation operations based, at least in part, on one or more positioning functions.

Processing unit(s) 502 may comprise a dedicated modem processor or the like that may be capable of performing baseband processing of signals acquired and downconverted at receiver(s) 510 of network interface unit 508 or SPS receiver 509. Similarly, a modem processor or the like may perform baseband processing of signals to be upconverted for transmission by (wireless) transmitter(s) 512. In alternative implementations, instead of having a dedicated modem processor, baseband processing may be performed by a general purpose processor or DSP (e.g., general purpose and/or application processor). It should be understood, however, that these are merely examples of structures that may perform baseband processing, and that claimed subject matter is not limited in this respect. Moreover, it should be understood that the example techniques provided herein may be adapted for a variety of different electronic devices, mobile devices, transmitting devices, environments, position fix modes, etc.

The techniques described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a computing device:
    obtaining at least a portion of a usage history for a first mobile device;
    applying a context-aware filter based, at least in part, on at least the portion of a first usage history to a plurality of mobile device applications to identify a list of applications for potential use by a second mobile device with respect to a particular environment the second mobile device has entered;
    in response to a first event, proffering an application selected from the list of applications for use by the second mobile device, the proffered application being based, at least in part, on at least the portion of the first usage history; and
    in response to a second event, determining whether to withdraw the application for use by the second mobile device based, at least in part, on at least the portion of the first usage history.

2. The method as recited in claim 1, wherein said context-aware filter is further based, at least in part, on:
    a location profile corresponding to the particular environment;
    a user profile corresponding to the second mobile device; or
    a second mobile device profile, or any combination thereof.

3. The method as recited in claim 2, and further comprising, at the computing device:
    maintaining the location profile; the user profile; the second mobile device profile; the first usage history, or any combination thereof.

4. The method as recited in claim 3, and further comprising, at said computing device:
    obtaining at least the portion of a second usage history for at least one of said plurality of mobile device applications from the first mobile device; and
    based, at least in part, on at least the portion of the second usage history, affecting at least one of: the location profile; the user profile; or the second mobile device profile, or any combination thereof.

5. The method as recited in claim 1, wherein applying the context-aware filter; proffering the application; or determining whether to withdraw the application, or any combination thereof, is based, at least in part, on at least a portion of a second usage history corresponding to one or more of the plurality of mobile device applications.

6. The method as recited in claim 5, wherein at least the portion of the second usage history is for one or more mobile devices.

7. The method as recited in claim 1, wherein the particular environment corresponds to: a local wireless network presence; a particular enterprise; a particular venue; a location context identifier (LCI); or an indoor environment, or any combination thereof.

8. The method as recited in claim 1, wherein proffering the application comprises providing the list of applications to the second mobile device.

9. The method as recited in claim 1, wherein proffering the application comprises: providing at least a portion of the application to the second mobile device; or identifying a resource device capable of providing at least the portion of the application, or any combination thereof, to the second mobile device.

10. The method as recited in claim 1, wherein proffering the application comprises initiating activation of the application at the second mobile device.

11. The method as recited in claim 1, wherein if the application is withdrawn, withdrawing the application comprises initiating deactivation of the application at the second mobile device.

12. The method as recited in claim 1, and further comprising, at the computing device:
obtaining the application from a resource device; and
storing the application in memory at the computing device.

13. An apparatus comprising:
means for obtaining at least a portion of a first usage history for a first mobile device;
means for applying a context-aware filter based, at least in part, on at least the portion of the first usage history to a plurality of mobile device applications to identify a list of applications for potential use by a second mobile device with respect to a particular environment the second mobile device has entered;
means for proffering an application selected from the list of applications for use by the second mobile device in response to a first event, the proffered application being based, at least in part, on at least the portion of the first usage history; and
means for determining whether to withdraw the application for use by the second mobile device in response to a second event.

14. The apparatus as recited in claim 13, wherein the context-aware filter is based, at least in part, on at least one of:
a location profile corresponding to the particular environment;
a user profile corresponding to the second mobile device; or
a second mobile device profile, or any combination thereof.

15. The apparatus as recited in claim 14, and further comprising at least one of:
means for maintaining the location profile;
means for maintaining the user profile;
means for maintaining the second mobile device profile; or
means for maintaining the first usage history, or any combination thereof.

16. The apparatus as recited in claim 15, and further comprising:
means for obtaining at least the portion of a second usage history for at least one of the plurality of mobile device applications from the first mobile device; and
means for affecting at least one of: the location profile; the user profile; or the second mobile device profile, or a combination thereof, based, at least in part, on at least the portion of the second usage history.

17. The apparatus as recited in claim 13, wherein the means for applying the context-aware filter; the means for proffering the application; or the means for determining whether to withdraw the application, or any combination thereof, is responsive, at least in part, to at least a portion of a second usage history corresponding to one or more of the plurality of mobile device applications.

18. The apparatus as recited in claim 17, wherein at least the portion of the second usage history is for one or more mobile devices.

19. The apparatus as recited in claim 13, wherein the particular environment corresponds to: a local wireless network presence; a particular enterprise; a particular venue; a location context identifier (LCI) or an indoor environment, or any combination thereof.

20. The apparatus as recited in claim 13, and further comprising:
means for providing the list of applications to the second mobile device.

21. The apparatus as recited in claim 13, and further comprising at least one of:
means for providing at least a portion of the application to the second mobile device;
or means for identifying a resource device capable of providing at least the portion of
the application to the second mobile device, or any combination thereof.

22. The apparatus as recited in claim 13, and further comprising:
means for initiating activation of the application at the second mobile device.

23. The apparatus as recited in claim 13, and further comprising:
means for initiating deactivation of the application at the second mobile device.

24. The apparatus as recited in claim 13, and further comprising:
means for obtaining the application from a resource device; and
means for storing the application.

25. A computing device comprising:
memory;
a network interface unit; and
a processing unit coupled to the memory and the network interface unit and configured to:
obtain at least a portion of a first usage history for a first mobile device;
apply a context-aware filter based, at least in part, on at least the portion of the first usage history to a plurality of mobile device applications to identify a list of applications for potential use by a mobile device with respect to a particular environment the second mobile device has entered;
in response to a first event, initiate transmission of a first indication via said network interface unit to the second mobile device, the first indication to proffer an application selected from the list of applications for use by the second mobile device, the proffered application being based, at least in part, on at least the portion of the first usage history; and
in response to a second event, initiate transmission of a second indication via said network interface unit to the second mobile device, the second indication to determine whether to withdraw the application for use by the second mobile device based, at least in part, on at least the portion of the first usage history.

26. The computing device as recited in claim 25, wherein the context-aware filter is based, at least in part, on at least one of:
a location profile corresponding to the particular environment;
a user profile corresponding to the second mobile device; or
a second mobile device profile,
or any combination thereof.

27. The computing device as recited in claim 26, the processing unit being further configured to:
maintain, in the memory: the location profile; the user profile; the second mobile device profile; or the usage history, or any combination thereof.

28. The computing device as recited in claim 27, said processing unit being further configured to:
obtain at least the portion of a second usage history for at least one of the plurality of mobile device applications from the at least one other device via the network interface unit; and based, at least in part, on at least the portion of the second usage history, affect at least one of: the location profile; the user profile; or the second mobile device profile, or any combination thereof.

29. The computing device as recited in claim 25, the processing unit being further configured to:
apply the context-aware filter, initiate transmission of the first indication, or initiate transmission of the second indication, or any combination thereof, based, at least in part, on at least a portion of a second usage history corresponding to one or more of the plurality of mobile device applications.

30. The computing device as recited in claim 29, wherein at least the portion of the second usage history is for one or more mobile devices.

31. The computing device as recited in claim 25, wherein the particular environment corresponds to at least one of: a local wireless network presence; a particular enterprise; a particular venue; a location context identifier (LCI); or an indoor environment, or any combination thereof.

32. The computing device as recited in claim 25, the processing unit being further configured to:
initiate transmission of the list of applications to the second mobile device via the network interface unit to proffer the application identified in the list of applications for use by the second mobile device.

33. The computing device as recited in claim 25, the processing unit being further configured to:
initiate transmission, via the network interface unit, of:
at least a portion of the application to the second mobile device; or
an identification of a resource device capable of providing at least the portion of the application, or any combination thereof, to the second mobile device.

34. The computing device as recited in claim 25, wherein the first indication is indicative of permission for activation of the application at the second mobile device.

35. The computing device as recited in claim 25, wherein the second indication is indicative of permission for deactivation of the application at the second mobile device.

36. The computing device as recited in claim 25, the processing unit being further configured to:
obtain the application from a resource device via the network interface unit; and
initiate storage of the application in the memory.

37. An article comprising:
a non-transitory computer readable medium having stored therein computer implementable instructions executable by a processing unit of a computing device to:
obtain at least a portion of a first usage history for a first mobile device;
apply a context-aware filter based, at least in part, on at least the portion of the first usage history to a plurality of mobile device applications to identify a list of applications for potential use by a second mobile device with respect to a particular environment the second mobile device has entered;
in response to a first event, initiate transmission of a first indication to the second mobile device, the first indication to proffer an application selected from the list of applications for use by the second mobile device, the proffered application being based, at least in part, on at least the portion of the first usage history; and
in response to a second event, initiate transmission of a second indication to the second mobile device, the second indication to determine whether to withdraw the application for use by the second mobile device based, at least in part, on at least a portion of the first usage history.

38. The article as recited in claim 37, wherein the context-aware filter is based, at least in part, on at least one of:
a location profile corresponding to the particular environment;
a user profile corresponding to the second mobile device; or
a second mobile device profile, or any combination thereof.

39. The article as recited in claim 38, the computer implementable instructions being further executable by the processing unit to:
maintain the location profile; the user profile; the second mobile device profile; or the first usage history, or any combination thereof.

40. The article as recited in claim 39, the computer implementable instructions being further executable by the processing unit to:
obtain at least the portion of a second usage history for at least one of the plurality of mobile device applications from first mobile device; and
based, at least in part, on at least the portion of the second usage history, affect at least one of: the location profile; the user profile; or the second mobile device profile, or any combination thereof.

41. The article as recited in claim 37, the computer implementable instructions being further executable by the processing unit to:
apply the context-aware filter, initiate transmission of the first indication, or initiate transmission of the second indication, or any combination thereof, based, at least in part, on at least a portion of a second usage history corresponding to one or more of the plurality of mobile device applications.

42. The article as recited in claim 41, wherein at least the portion of the second usage history is for one or more mobile devices.

43. The article as recited in claim 37, wherein the particular environment corresponds to: a local wireless network presence; a particular enterprise; a particular venue; a location context identifier (LCI) or an indoor environment, or any combination thereof.

44. The article as recited in claim 37, the computer implementable instructions being further executable by the processing unit to:
initiate transmission of the list of applications to the second mobile device to proffer the application identified in the list of applications for use by the second mobile device.

45. The article as recited in claim 37, the computer implementable instructions being further executable by the processing unit to:
initiate transmission of:
at least a portion of the application to the second mobile device; or
an identification of a resource device capable of providing at least the portion of the application, or any combination thereof, to the second mobile device.

46. The article as recited in claim 37, wherein the first indication is indicative of permission for activation of the application at the second mobile device.

47. The article as recited in claim 37, wherein the second indication is indicative of permission for deactivation of the application at the second mobile device.

48. The article as recited in claim 37, the computer implementable instructions being further executable by the processing unit to:

obtain the application from a resource device; and initiate storage of the application.

49. The method of claim 1, wherein the computing device is physically located within the particular environment, the particular environment corresponding to a local wireless network presence or a venue.

50. The method of claim 1, wherein the computing device comprises a femtocell, network access point, or picocell located within the particular environment.

* * * * *